March 25, 1930.  K. M. MacLENNAN ET AL  1,751,519
CLEAR VISION DEVICE
Filed Nov. 26, 1928   2 Sheets-Sheet 2
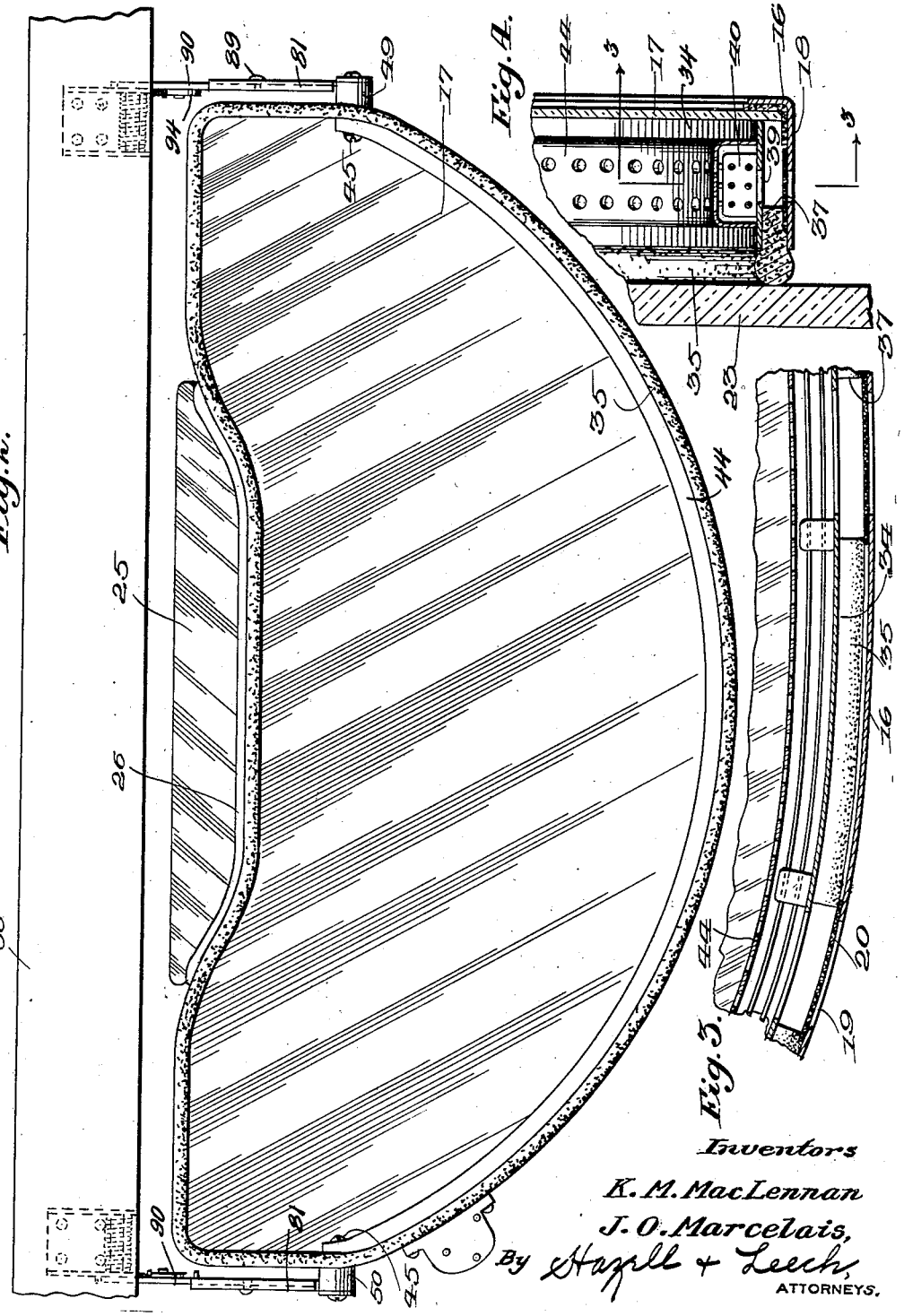
Inventors
K. M. MacLennan
J. O. Marcelais,
By Hazell & Leech,
ATTORNEYS.

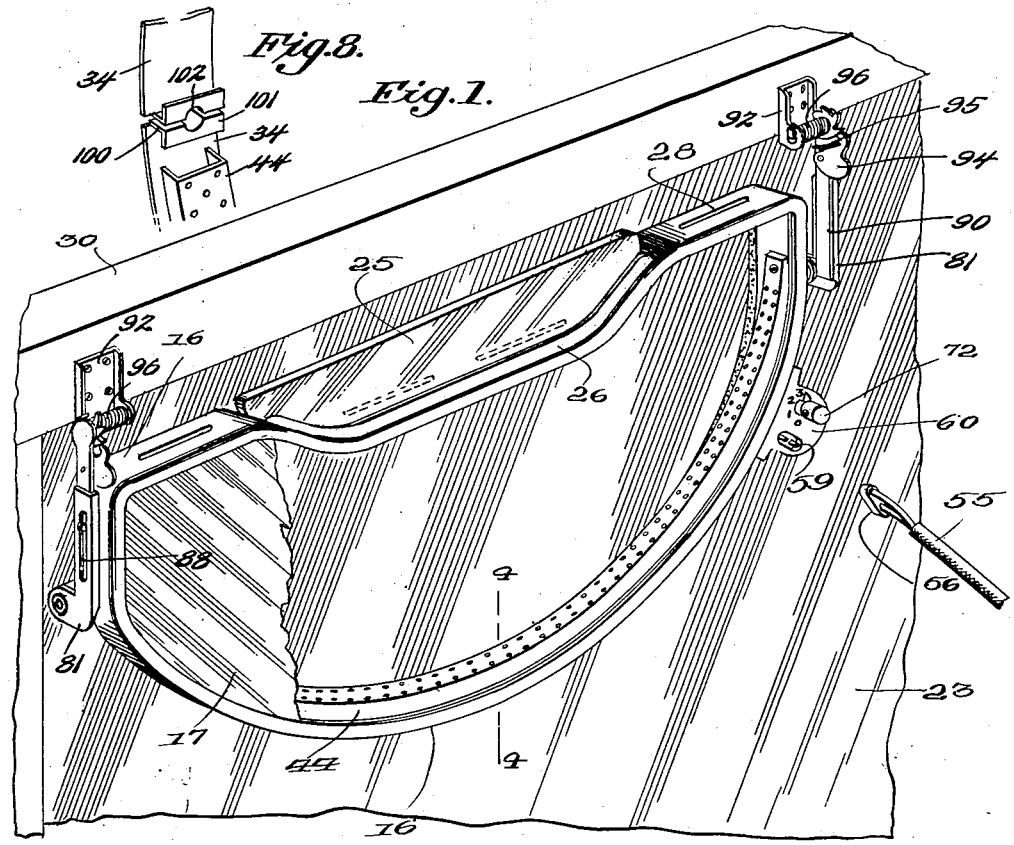
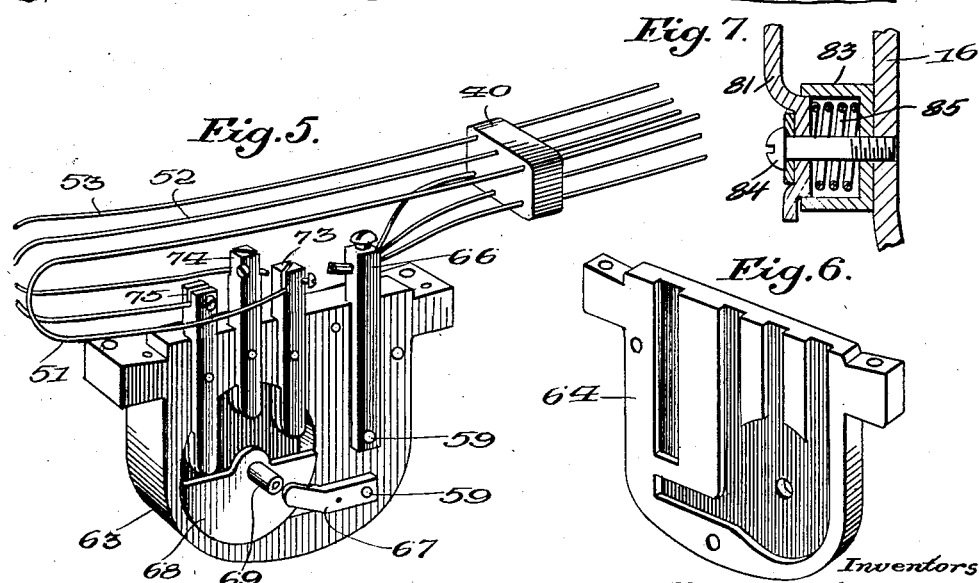

Patented Mar. 25, 1930

1,751,519

UNITED STATES PATENT OFFICE

KENNETH M. MacLENNAN, OF AYER, AND JOSEPH O. MARCELAIS, OF FITCHBURG, MASSACHUSETTS, ASSIGNORS TO SAFETY CLEAR VISION, INC., OF FITCHBURG, MASSACHUSETTS, A CORPORATION OF MASSACHUSETTS

CLEAR-VISION DEVICE

Application filed November 26, 1928. Serial No. 321,969.

The present invention relates to a device for use in connection, for example, with an automobile windshield, and which is movable into and out of operative position with respect thereto.

The purpose of the invention is to keep the windshield, or a portion thereof, free of ice, snow and fog condensation, so that visibility through the windshield is not impaired, and a further object of the invention is the provision of means for preventing glare from natural or artificial light while at the same time giving the driver a clearly defined view ahead.

The invention consists of a movable and removable attachment located on the driver's side of the windshield, and providing with the windshield a substantially glass-enclosed compartment, the air in which may be heated to varying degrees by means provided by the invention, and which is constructed with ventilating openings to prevent any condensation of moisture within the compartment. The glass used in the invention is preferably a moderately heavily leaded glass, though it will be understood that other glare preventing or glare minimizing glass may be used.

It will also be understood that the use of the invention is by no means limited to automobile windshields, but that the invention may be used in connection with any other piece of glass through which it is desired to maintain unobstructed vision.

A preferred embodiment of the invention is illustrated in the accompanying drawings, which show a form thereof particularly adapted to automobile windshields, especially where a windshield wiper is used, but the drawings are not to be taken as defining the limits of the invention, reference being had to the appended claims for that purpose.

In the drawings:

Fig. 1 is a perspective view, partly broken away, showing the invention in operative position and applied to the windshield of an automobile;

Fig. 2 is a face elevation thereof, on a slightly enlarged scale, showing the side adjacent the windshield;

Fig. 3 is a longitudinal sectional view of a portion of the bottom part of the device, the section being on line 3—3 of Fig. 4;

Fig. 4 is a sectional view through the lower portion of the device, at right angles to Fig. 3, and taken on the line 4—4 of Fig. 1;

Figs. 5 and 6 are enlarged perspective views of the two parts of the heating switch;

Fig. 7 is an enlarged sectional view through one of the pivots by which the device is supported; and Fig. 8 is an enlarged perspective view of a detail of construction.

Referring in detail to the drawings, a frame 16, which is right-angular in cross section, carries a conforming piece of leaded glass 17, which fits within the frame and is spaced from the inner frame flange by a cork spacer 18. The horizontally extending portion of the frame 16 is provided at intervals with openings 19 for ventilating purposes, and these openings 19 may be protected or covered with wire mesh 20 if desired. The frame 16 is preferably substantially semi-circular at the bottom and is designed to conform to the arc swept by a windshield wiper on the opposite side of an automobile windshield 23. The frame 16 is substantially flat at its top, except for a depression centrally located in the top of the frame, within which is located a removable piece of leaded glass 25 supported vertically in a grooved holder 26, which is welded or otherwise secured to the top side of the depressed portion of the frame and is located on the edge of the frame nearest the driver and furthest from the windshield. The top of the frame 16 is provided with ventilating openings 28, which cooperate with the ventilating openings 19 to permit air to pass upwardly between the windshield and the leaded glass 17.

Where the casing containing the actuating mechanism of a windshield wiper projects downwardly from an automobile top frame or windshield frame 30, the glass 25 may be removed to accommodate such casing; but where such casing does not project downwardly, but is located above the bottom of the frame 30, the glass 25 may be left in place, as shown in Fig. 2.

An arcuate metal support 34 is located within the frame 16 and is spaced from the horizontally extending flange thereof by a cork spacing and abutment member 35, the outer end of which abuts against the windshield 23, and the inner end of which abuts against the leaded glass 17. The cork 35 is provided with cut-out portions 37 corresponding to the openings 19, and the support 34 is similarly provided with corresponding openings 39, so that ventilation into the interior of the compartment between the windshield 23 and glass 17 can occur through these aligned openings.

The invention provides a heating element or a plurality of heating elements located within the compartment for the purpose of heating the air in such compartment and warming the windshield to such an extent as to make it impossible for ice or snow or fog condensation to remain on the outside of the windshield.

In the present embodiment, the heating element preferably includes a plurality of separate electric circuits each consisting of a heating wire, for example, as shown in Fig. 5. The heating wires pass through spaced-apart insulating blocks 40 and are curved to correspond to the shape of the lower portion of the frame 16.

An arcuate, perforated, channel-shaped protector 44 is located over the heating elements, as shown particularly in Figs. 1 and 4, and is secured in place by screws 45 passing through the ends of the member 44 and into the frame 16. The heating elements are thereby maintained in fixed position within the frame 16 separated from each other and supported by the insulating blocks 40, which in turn rest upon the heating element supporting member 34.

This construction provides a ventilated compartment which may be heated when desired, located on the inner side of the windshield, the cork member 35 of which maintains the glass 17 in position and also bears against the windshield 23.

The heating elements in the present embodiment consist of three heating wires 51, 52 and 53, through which an electric current may pass from any suitable source, such, for example, as the battery of an automobile. It has been found convenient to run a cable 55 from the starter, the two conduits of the cable leading to a plug of insulating material 56 provided with contact openings therein which respectively fit over a pair of conducting projections 59 extending from the bottom of a countersunk portion in a switch casing 60. The plugs 59 are shorter than the depth of the countersunk portion for protection, and the provision of openings in the insulated plug 56 prevents any possibility of short-circuiting regardless of the handling of the plug. The cable 55 may be disconnected from the switch casing when not in use.

Referring particularly to Figs. 5 and 6, the switch casing comprises two cooperating members 63 and 64, which are riveted or screwed together and include between them the switch mechanism. One of the plugs 59 is connected to a binding post 66, and the other is connected to a conducting member 67, which bears on the semicircular switch member 68 mounted for rotary movement on a pin 69 provided with a handle 72, which may be provided with an indicator which may cooperate with numbered indications on the face of the switch casing to indicate whether or not the switch is off or whether one, two or three of the heating elements are in operation. The semicircular switch plate 68 is moved counterclockwise, as viewed in Fig. 5, to bring a series of binding posts 73, 74 and 75 successively into operation by bridging the gap between the conducting member 67 and said binding posts. Each of the heating wires 51, 52 and 53 is designed to take five amperes, and at their tops the binding posts 73, 74 and 75 are screw-connected to the heating wires 51, 52 and 53 respectively. A suitable form of binding post connection for the heating wires which is particularly efficient in assembling is that shown in Fig. 5, where the binding posts are slotted across their tops, at the bottom of which slots the heating wires rest and are held in place by screws. All of the heating wires 51, 52 and 53 at their other ends are led to the binding post 66, in which they are held by suitable means such as a screw. The switch casing 60 is screwed or otherwise secured to the frame 16 in a position for convenient operation by the driver.

The invention provides means for holding the frame 16 out of cooperative relation with the windshield, and also provides means for preventing vibration of any parts of the frame and for preventing it from falling against the windshield with force sufficient to cause damage.

For this purpose the frame 16 is suspended at opposite ends from the pivot portions of two arms 81. At their lower ends these arms are provided with depressions extending inwardly toward the frame, and the depressed portions fit within cylindrical cups 83 and form bearings therein, the cups being welded or otherwise secured to the frame 16. Machine screws 84 pass through the arms 81 at their depressed portions and extend inwardly, being threaded through the bottoms of the cups and into the frame 16. In each cup 83 a coil spring 85 under compression encircles the machine screw, the purpose of the spring being to bear frictionally against the arm 81 and against the bottom of the cup, so that when the frame 16 is rotated about its pivots, it will be held frictionally in any position to which it may be brought.

Each arm 81 is provided with a slot 88, through which passes a screw 89 threaded into a cooperating complementary arm 90. This construction provides for vertical adjustment of the frame 16 with respect to the windshield. At their upper ends the arms 90 are provided with pivots passing through aligned ears formed on securing brackets 92, which are fastened by screws to the wooden frame above the windshield 27. The outer ear of each bracket, in addition to being perforated for the pivot pin, is formed with ratchet teeth for cooperation with a pawl 94 pivoted at the upper end of each complementary arm 90 and urged in the direction of the ratchet teeth by a small coil spring 95 secured at one end to the pawl and at the other end to the complementary arm.

As a result of this construction, the frame 16 may be moved away from the windshield about the upper pivot pins and if desired during this movement it may be maintained in a vertical plane, or it may be swung about its lower pivots and moved towards horizontal position completely clear of the windshield and adjacent the top of the car, where it may be maintained in this inoperative position as long as desired.

The frame 16 is maintained in this inoperative position by the pawls and ratchets already described, and when the frame 16 is lowered to operative position, the pawls are released by moving them out of engagement with their ratchets, for which purpose a thumb-operated projection is provided on each pawl. Should the device be dropped or slip out of the hands of the driver, it will not crash against the windshield because the spring-pressed pawls will cooperate with the ratchet teeth to prevent further downward movement of the frame.

For the purpose of preventing vibration of the frame with respect to the windshield and in order to hold it against the windshield at all times, a coil spring 96 is provided between the ears of each securing bracket 92, the coil spring being secured at one end to the bracket and at the other end to the upper pivot pin. When the frame 16 is raised to inoperative position, it is raised against the action of these coil springs, and when the frame 16 is lowered, said springs urge it downwardly, and, when the frame is released, it is urged by these springs into constant contact with the windshield.

It will be seen from the foregoing description that the invention provides a substantially glass-enclosed space adjacent the windshield, the air in which space may be heated to varying degrees, thereby preventing obstruction of vision due to snow, ice or fog condensation, which cannot remain on the windshield within the area of the frame 16. It is to be observed that no rheostat is used in connection with the heating elements, but that each of these elements is separate, so that if one is damaged, the others will continue to function. It will also be seen that the glare-preventing glass insures restful driving without eyestrain during the day, and at night enables the driver to see clearly the road ahead without being blinded or confused by approaching lights. The invention also provides a heated area corresponding to the sweep of the usual windshield, and by providing sufficient heat to melt ice or snow on the outside of the windshield, it enables the windshield wiper to function in all weathers regardless of low temperatures. Moreover, particularly in night driving, where the road dips into a hollow, it sometimes happens that the inside of the windshield becomes clouded by moisture condensation, which is not removed by the ordinary windshield wiper located on the outside of the windshield, but which is made impossible by the present invention, which, due to the heat supplied, prevents such moisture condensation, and, due to the ventilated frame, prevents moisture condensation within the space between the windshield and the glare-preventing glass.

It is to be noted that the frame 16 is shaped to provide a heated area outside the arc swept by the windshield wiper at each end of the arc so that any snow accumulated by the wiper at either end of its stroke cannot remain there, but will melt or slide down due to the heat provided by the invention.

In Fig. 8 we have disclosed a detail of construction which is of particular value in tying the heater and insulating blocks supporting the heater wires in place and in making possible an easy and economical assembly of our clear vision device.

The arcuate metal supports 34, located within the frame 16 and heretofore referred to, are made in two sections, one section extending within the frame over the upper portion thereof from the screw 45 on one side to the screw 45 on the opposite side. The second section of the supports 34 lies within the frame in the lower portion thereof from the screw 45 on one side to the screw 45 on the other.

As is clearly indicated in Fig. 8, the two sections 34 are provided with ends 100 turned at right angles to the main support with their outer ends 101 turned at ninety degrees to section 100. It will be noted that the turned portions are reduced in width over the main sections 34, so that the channel-shaped protector 44 fits snugly thereover. The abutting faces 100 are each pressed out at 102 so as to form a circular opening when the ends are brought together. The screw 45 lies between the two sections and in the pressed-out portions, so that when tightened it binds the two sections firmly together and creates a tying up of the entire heating and insulating structures.

Various changes and modifications may be made within the scope of the invention as defined by the following claims.

What is claimed is:

1. An attachment for windshields and the like including a glass-carrying frame, a plurality of separate successively operable heating elements carried thereby, and switch means for bringing said heating elements successively and additively into operation.

2. An attachment for windshields and the like including a ventilated glass-carrying frame having an arcuate lower portion, a plurality of separate arcuate heating elements carried by the lower portion of said frame, and switch means for bringing said heating elements successively and additively into operation.

3. An attachment for windshields and the like including a ventilated glass-carrying frame having an arcuate lower portion, a plurality of separate arcuate heating elements supported by the lower portion of said frame, switch means for bringing said heating elements successively and additively into operation, a yieldable windshield abutment member spacing said heating elements from said frame bottom, and an arcuate ventilated channel member enclosing said heating elements.

4. An attachment for windshields and the like including a pair of brackets, an arm pivoted to each of said brackets and formed at its lower end with a bearing portion, a glass-carrying frame having cup members pivotally carried by said bearing portions, friction springs bearing against said cup members and said pivot portions, means urging said frame into operative position against a windshield, and heating elements carried in said frame.

5. An attachment for windshields and the like including a pivotally mounted glass-carrying frame, a plurality of separated heating elements carried thereby, spring means urging said frame into operative position, and pawl and ratchet devices for holding said frame in inoperative position against the action of said spring means.

6. An attachment for windshields and the like including a pivoted glass-carrying frame having a depression in its top, a removable glass section carried in said depression and having substantially the shape thereof, and heating elements carried within said frame.

7. An attachment for windshields and the like including a glass-carrying frame, a plurality of separate heating elements carried thereby, and switch means for bringing said heating elements successively and additively into operation, said switch means including a binding post for each of said heating elements and an arcuate contact member movable into contact successively and additively with said binding posts.

KENNETH M. MacLENNAN.
JOSEPH O. MARCELAIS.